(12) United States Patent
Michiels et al.

(10) Patent No.: US 12,455,976 B2
(45) Date of Patent: Oct. 28, 2025

(54) METHOD FOR PROTECTING A MACHINE LEARNING MODEL FROM BEING COPIED

(71) Applicant: NXP B.V., Eindhoven (NL)

(72) Inventors: Wilhelmus Petrus Adrianus Johannus Michiels, Reusel (NL); Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 577 days.

(21) Appl. No.: 18/051,531

(22) Filed: Nov. 1, 2022

(65) Prior Publication Data

US 2024/0143826 A1     May 2, 2024

(51) Int. Cl.
*G06F 21/12* (2013.01)
*G06F 16/11* (2019.01)
*G06F 21/62* (2013.01)
*G06N 5/04* (2023.01)
*G06N 20/00* (2019.01)

(52) U.S. Cl.
CPC ........... *G06F 21/6227* (2013.01); *G06N 5/04* (2013.01)

(58) Field of Classification Search
CPC ........ G06F 21/6227; G06F 21/12; G06F 3/06; G06F 16/11; G06N 5/04; G06N 20/00
USPC .......................................................... 706/12
See application file for complete search history.

(56) References Cited

U.S. PATENT DOCUMENTS

| | | |
|---|---|---|
| 11,321,456 B2 | 5/2022 | Derks et al. |
| 2020/0233936 A1* | 7/2020 | Veshchikov ........ G06F 18/2155 |
| 2020/0327443 A1* | 10/2020 | Van Vredendaal ... G06F 21/554 |
| 2021/0019661 A1* | 1/2021 | Bos ........................ G06N 3/045 |
| 2021/0034721 A1* | 2/2021 | Bos ........................ G06N 3/082 |

OTHER PUBLICATIONS

Correia-Silva, Jacson Rodrigues et al.; "Copycat CNN: Stealing Knowledge by Persuading Confession with Random Non-Labeled Data"; https://arxiv.org/abs/1806.05476v1, Submitted Jun. 13, 2018; https://doi.org/10.48550/arXiv.1806.05476.

Lee, Kimin et al.; "A Simple Unified Framework for Detecting Out-of-Distribution Samples and Adversarial Attacks"; https://arxiv.org/abs/1807.03888v2; Submitted Jul. 10, 2018, Last Revised Oct. 27, 2018; https://doi.org/10.48550/arXiv.1807.03888.

(Continued)

*Primary Examiner* — Jude Jean Gilles

(57) ABSTRACT

A method is provided for protecting a machine learning (ML) model from being copied. An input sample is provided to the ML model for an inference operation. Features from an internal layer of the ML model relating to the sample are selected. Positive gradients of the features to output logits of the ML model are selected. A summation of a product of the positive gradients and the features is computed to determine a feature contribution value. The input sample is a non-problem domain sample if the feature contribution value is less than or equal to a predetermined threshold feature contribution value. An attempt to copy the ML model is determined to be underway if a predetermined percentage of a plurality of input samples input to the ML model has a feature contribution value that is less than or equal to the predetermined threshold feature contribution value.

20 Claims, 5 Drawing Sheets

(56) References Cited

OTHER PUBLICATIONS

Liang, Shiyu et al.; "Enhancing the Reliability of Out-Of-Distribution Image Detection in Neural Networks"; https://arxiv.org/abs/1706.02690v5; Submitted Jun. 8, 2017; Last Revised Aug. 30, 2020; https://doi.org/10.48550/arXiv.1706.02690.

Orekondy, Tribhuvanesh et al.; "Knockoff Nets: Stealing Functionality of Black-Box Models"; https://arxiv.org/abs/1812.02766v1; Submitted Dec. 6, 2018; https://doi.org/10.48550/arXiv.1812.02766.

Ren, Jie et al.; "A Simple Fix to Mahalanobis Distance for Improving Near-OOD Detection"; https://arxiv.org/abs/2106.09022v1; Submitted Jun. 16, 2021; https://doi.org/10.48550/arXiv.2106.09022.

Srivastava, Anugya et al.; "Out of Distribution Detection on ImageNet-O"; https://arxiv.org/abs/2201.09352v1; Submitted on Jan. 23, 2022; https://doi.org/10.48550/arXiv.2201.09352.

Tramer, Florian et al.; "Stealing Machine Learning Models via Prediction APIs"; 25th USENIX Security Symposium, Aug. 10-12, 2016, Austin, Texas; https://doi.org/10.48550/arXiv.1609.02943.

Xu, Keyang et al.; "Unsupervised Out-of-Domain Detection via Pre-trained Transformers"; https://arxiv.org/abs/2106.00948v2; Submitted Jun. 2, 2021; Last Revised May 20, 2022; https://doi.org/10.48550/arXiv.2106.00948.

Yang, Jingkang et al.; "Generalized Out-of-Distribution Detection: A Survey"; Submitted Oct. 21, 2021; https://arxiv.org/abs/2110.11334; https://doi.org/10.48550/arXiv.2110.11334.

\* cited by examiner

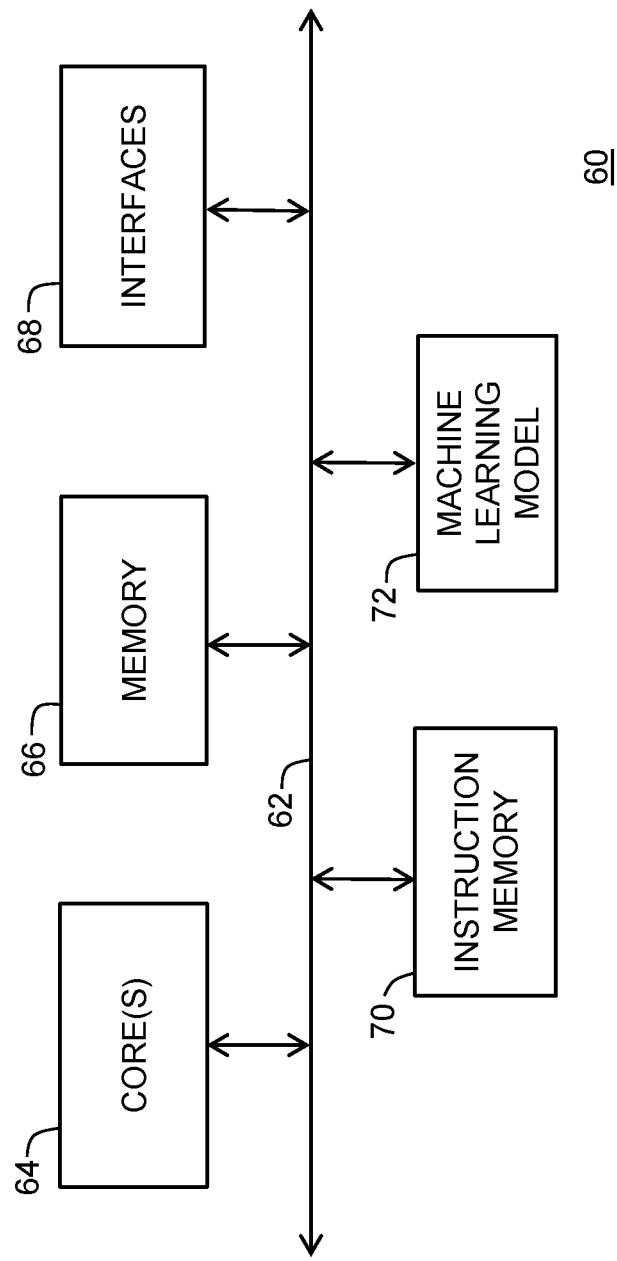

METHOD FOR PROTECTING A MACHINE LEARNING MODEL FROM BEING COPIED

BACKGROUND

Field

This disclosure relates generally to machine learning, and more particularly, to a method for protecting a machine learning (ML) model from being copied.

Related Art

At present, more and more functionality is implemented via machine learning (ML) algorithms. Some of a ML models advantages include: flexibility, ability to handle large amounts of data, ease of customization, and ability to solve recognition problems that are difficult for standard algorithms to solve.

The effectiveness of a ML algorithm, which is determined by its accuracy, execution time, and storage requirements, generally depends on the quality as well as quantity of the available training data. The expertise that goes into the compilation of a representative training set and the cost involved in getting it a training data set labeled makes the training data, as well as the model obtained from it, a very valuable asset. However, it has been demonstrated that even in the case that a machine learning model is stored securely, the ML model is still vulnerable to an attacker that tries to steal or copy it. An attacker can get a very good clone of a ML model with only black-box access. More precisely, in this attack a copyist queries the target model with a large set of arbitrary inputs and next trains its own model with the training set created from these input-output pairs. Hence, whereas the developer needs to invest in a high-quality training set, a copyist only requires a large arbitrary dataset, such as ImageNet, for an image classification problem.

Once having the machine learning model, the copyist can illegitimately monetize it. For instance, by implementing it on its own competing device or by offering it as a service via the cloud (ML-as-a-service). Since the investment of the copyist is much smaller than the developer, he can do this at a much lower cost.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 5 illustrates a data processing system useful for implementing the illustrated embodiments.

DETAILED DESCRIPTION

Figure 1:
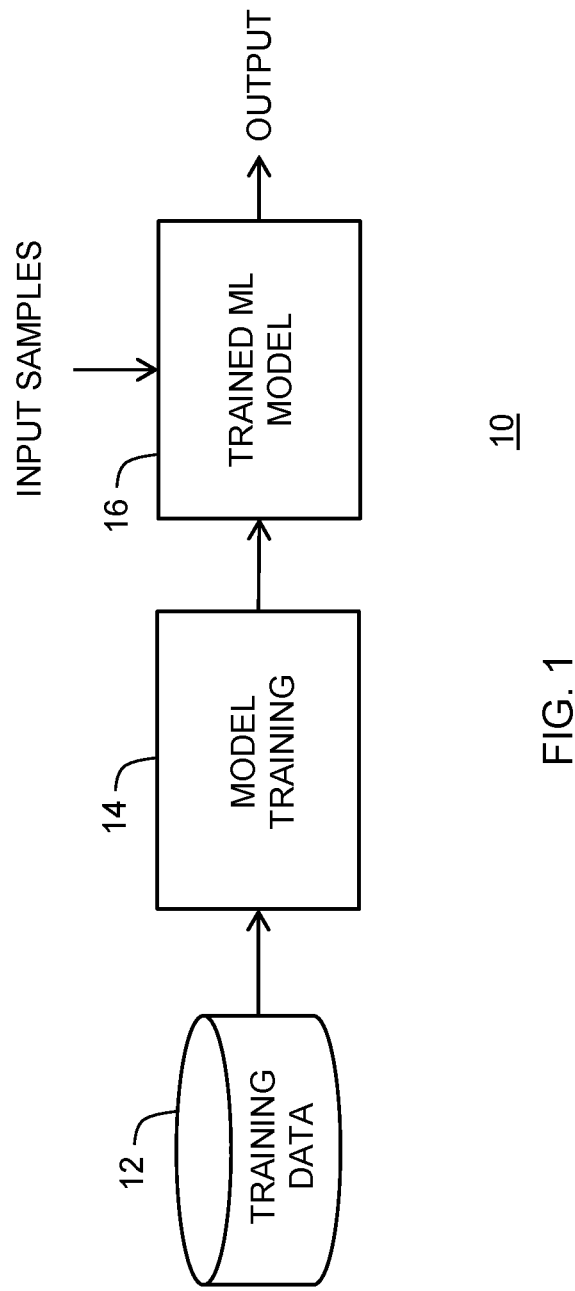
FIG. 1 illustrates a simplified system for training and using a ML model in accordance with an embodiment.

Generally, there is provided, a method for protecting a machine learning (ML) model from being copied. In one embodiment, the ML model includes a neural network (NN) having a plurality of layers. Each of the layers has a plurality of nodes. An input sample of a plurality of input samples is provided to the ML model for an inference operation. Also, features from an internal layer of the ML model relating to the sample are selected. In one embodiment, the internal layer may be a second to last layer. Also, the second to last layer is one of either a global average pooling layer or a global max pooling layer. The last layer may be a fully connected layer. Positive gradients of the output logits to the feature values are selected. A summation of products of the positive gradients with features is computed to determine a feature contribution value. In one embodiment, the features may be from the second to last layer and the positive gradients may be positive weights from an output of a second to last layer of the ML model. The weights are multiplied by the corresponding features and summed to determine the feature contribution value. The input sample is determined to be a NPD sample if the feature contribution value is less than or equal to a predetermined threshold feature contribution value. For the rest of the plurality of input samples, a summation of the product of the weights with the features is computed. In one embodiment, it is determined that an attempt to copy the ML model is underway if a predetermined percentage of the plurality of input samples is less than or equal to the predetermined threshold feature contribution value. An action is taken to protect the ML model from coping in response to determining that an attempt to copy the ML model is underway. The method, as set forth herein, provides very good accuracy identifying NPD samples, and has very few false positives.

In accordance with an embodiment, there is provided, a method for protecting a machine learning (ML) model from being copied, the method including: providing an input sample to the ML model for an inference operation; selecting features from an internal layer of the ML model, the features relating to the input sample; selecting positive gradients of output logits to the features of the ML model; computing a summation of a product of positive gradients and the features to determine a feature contribution value; determining that the input sample is a NPD sample if the feature contribution value is less than or equal to a predetermined threshold feature contribution value; and determining that an attempt to copy the ML model is underway if a predetermined percentage of a plurality of input samples input to the ML model has feature contribution values that are less than or equal to the predetermined threshold feature contribution value. The internal layer may be one of either a global average pooling layer or a global max pooling layer. The logits may be provided by a fully connected layer. Selecting positive gradients of the features to output logits may further include selecting weights from a second to last layer that are greater than zero. The ML model may be used for image classification. The method may further include taking an action to protect the ML model from coping in response to determining that an attempt to copy the ML model is underway. Taking an action to protect the ML model may further include one or more of limiting a number of input samples within a time window, reporting the copying attempt to a host processor, and substituting a lower quality ML model. The internal layer may be a global average pooling layer, the method may further include adding a branch to the ML model starting before the global average pooling layer, wherein the branch includes a global max pooling layer and a fully connected layer, and wherein the ML model provides predictions for the inference operation in response to receiving the sample, and the branch determines if the sample is a NPD sample. The predetermined threshold feature contribution value may be predetermined by profiling the ML model on a plurality of NPD samples. The predetermined percentage of the input samples that are less than or equal to the predetermined threshold feature contribution value may be one percent.

In another embodiment, there is provided, a method for protecting a machine learning (ML) model from being copied, the method including: inputting a sample of a plurality of samples to the ML model for an inference operation; selecting weights from an output of a second to last layer to a last layer of the ML model; selecting features from the second to last layer of the ML model relating to the sample; computing a summation of the weights multiplied by the features to determine a feature contribution value; determining that the sample is a NPD sample if the feature contribution value is less than or equal to a predetermined threshold feature contribution value; computing the computation of the feature contribution value for the rest of the plurality of samples; determining that an attempt to copy the ML model is underway if a predetermined percentage of the plurality of samples has a feature contribution value that is less than or equal to the predetermined threshold feature contribution value; and taking an action to protect the ML model from being copied in response to the predetermined percentage being met. The second to last layer may be one of either a global average pooling layer or a global max pooling layer. The last layer may be a fully connected layer. Selecting weights from an output of the second to last layer may further include selecting weights that are greater than zero. The ML model may be used for image classification. Taking an action to protect the ML model may further include one or more of limiting the number of samples that can be input in a given time window, reporting the copying attempt to a host processor, and substituting a lower quality ML model. The second to last layer may be a global average pooling layer, the method may further include adding a branch to the ML model starting before the global average pooling layer, wherein the branch includes a global max pooling layer and a fully connected layer, and wherein the ML model provides predictions for the inference operation in response to receiving the sample, and the branch determines if the sample is a NPD sample. The predetermined threshold feature contribution value may be predetermined by profiling the ML model on a plurality of NPD samples. The predetermined percentage of the input samples that are less than or equal to the predetermined threshold feature contribution value may be one percent. The method may be implemented as a computer program comprising instructions stored in a non-transitory machine-readable storage medium.

For the cloning attack to be successful, two properties should be true: (1) the copyist makes queries with a very diverse dataset, and (2) the dataset is large enough. The method for protecting an ML model uses the diversity of the dataset to detect within a reasonable number of queries that a model is under attack. The first property gives the diversity and the second property implies it is not necessary to detect the attack instantly. Once a cloning attack is detected, adequate action can be taken to protect the ML model from copying, such as for instance limiting the number of queries that can be made or reporting the possible attack to the backend to, e.g., a host processor.

FIG. 1 illustrates a simplified system 10 for training and using a ML model in accordance with an embodiment. System 10 includes a labeled set of ML training data 12, model training block 14, and resulting trained ML model 16.

In one embodiment, ML model 16 is implemented as a computer program including executable instructions stored on a non-transitory storage medium. In one example embodiment, ML model 16 includes an artificial neural network (NN) algorithm used to classify images. In another embodiment, ML model 16 may be used for a different task, such as speech tasks or sensor tasks. Trained ML model 16 may be loaded onto an integrated circuit device and used to recognize, for example, road signs in an automotive application. In other embodiments, ML model 16 may be different.

In accordance with an embodiment, trained ML model 16 may be a network including convolutional layers, fully connected layers, or other types of layers. Generally, a NN includes one or more input layers, one or more output layers, and one or more intermediate layers between the input and output layers. Each layer can have any number of nodes, or neurons. Typically, each of the nodes includes an activation function. There can be any number of intermediate layers. Each intermediate layer can include any number of nodes and concludes with a last hidden or last intermediate layer before one or more output layers. There can be any number of output nodes in the output layers. Typically, the number of output nodes is equal to the number of classes in a NN used for classification. Neural networks may also be used for other applications, such as object detectors.

An ML model is trained in model training 14 using training data 12 comprising a plurality of labeled images. Training data 12 may include images that are labeled by classes, such as for example, bird, cat, dog, bus, traffic light, etc. If the ML model is to be used as an object detector, the training data includes images with more than one labeled object. After training, trained ML model 16 can be used for inference operations. In an inference operation, one or more input samples labeled "INPUT SAMPLES" are input into ML model 16 and an output classification prediction labeled "OUTPUT" is provided by trained model 16. For purposes of this description, problem domain (PD) data samples are samples that are within a distribution of samples the ML model was trained on. Non-problem domain data (NPD) samples are samples that are not within a distribution of samples the ML model was trained on.

Figure 2:
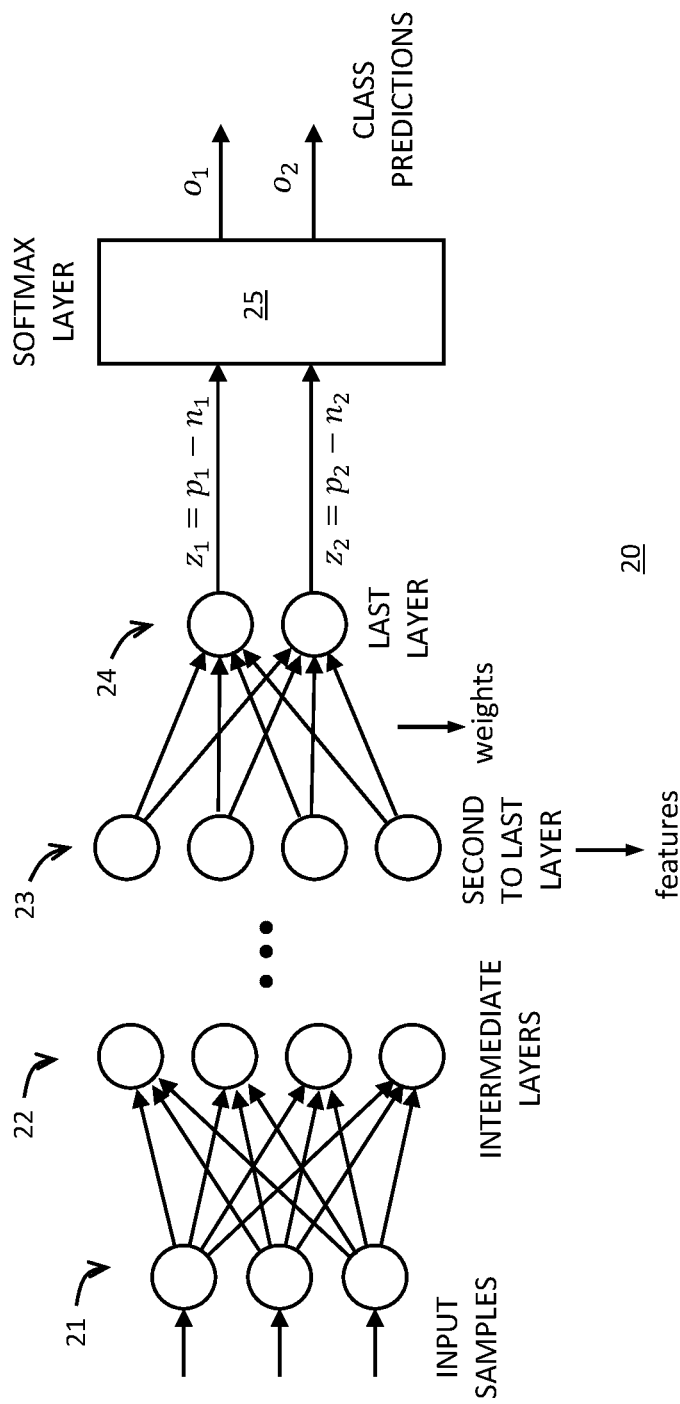
FIG. 2 illustrates a simplified neural network in accordance with an embodiment.

FIG. 2 illustrates a simplified neural network 20 in accordance with an embodiment. Neural network 20 includes input layer 21 for receiving a plurality of input samples (INPUT SAMPLES). The input samples may be images. Input layer 21 includes a plurality of connections to nodes of the first layer of a plurality of intermediate, or hidden, layers 22. Each layer of the plurality of intermediate layers includes a plurality of nodes, or neurons. In one embodiment, plurality of intermediate layers 22 may be, for example, a plurality of convolutional layers. Each layer of plurality of intermediate layers 22 are connected to at least one of the other intermediate layers. The connections may include weights whose values were determined during training of the ML model. Layer 23 is a second to last layer of NN 20. In one embodiment, layer 23 is a global average pooling layer. In another embodiment, layer 23 is a global max pooling layer. Layer 24 is a last layer of NN 20 before Softmax layer 25. In one embodiment, layer 24 is a fully connected layer. Nodes of layer 23 are connected to nodes of layer 24. Each of the connections are weighted with a weight value. Last layer 24 is connected to a Softmax layer 25. Outputs of layer 24 include logits $z_i$ and $z_2$, where $p_i$ is the sum of the features that have a positive contribution to logit $z_i$ and $n_i$ is the sum of the features that have a negative contribution to logit $z_i$. Layer 25 has m output nodes and provides output class predictions (CLASS PREDICTIONS). The values before the normalization, which is typically done via Softmax layer 25 are call logits. Normalized output values/probabilities are referred to herein as $o_1, o_2, \ldots, o_m$. Furthermore, L is an internal layer such as the second to last layer 23 in NN 20 having k nodes, called "features".

Generally, the feature values are referred to as $f_1, f_2, \ldots, f_k$. A value $s_{i,j}$ is the gradient of $z_j$ to $f_i$, i.e., $$s_{i,j} = \frac{\partial z_j}{\partial f_i}$$

where i is a node in an internal, hidden, layer and j is a node in last layer 24. In an embodiment, L is the second to last layer 23, which implies that $s_{i,j}$ equals a weight $w_{i,j}$ associated with an edge feature from node $f_i$ to logit value $z_j$.

The equation $p_j = \Sigma_{s_{i,j}>0} s_{i,j} \cdot f_i$ provides the total positive contribution of the feature values to logit value $z_j$. Similarly, the equation $n_j = \Sigma_{s_{i,j}>0} s_{i,j} \cdot f_i$ provides the total negative contribution of the feature values to logit value $z_j$.

The method determines an input sample is very likely a non-problem domain (NPD) sample by checking for a threshold T and a function h whether $$\max_j h(p_j, n_j) \leq T \qquad (1)$$

In one embodiment, the threshold value T can be derived in a profiling phase. For instance, the model is run on multiple NPD samples and T is defined such that for some ratio r, a fraction of r NPD samples has a value of $\max_j h(p_j, n_j)$ that is below T. Possible choices of h are:

$$h(p_j, n_j) = p_j$$

$$h(p_j, n_j) = n_j$$

$$h(p_j, n_j) = p_j + n_j$$

The inventors have determined the best results is provided using $p_j$.

Neural networks often contain a global average pooling layer after the last convolutional layer. In a preferred implementation, this layer is replaced by a global max pooling layer. Note that this change is only made for doing the NPD detection. The originally used global average pooling layer is still used for making predictions. If Equation (1) is true, then it is likely that a model is queried with NPD data. The device can then decide to either immediately take action, or to only take action after this has happened a given number of times. Example actions that can be taken include limiting the number of queries that can be made in a given time window (throttling), reporting the possible attack to a host processor, and moving inference operation to a lower-quality model. Furthermore, immediate action may be taken, or action may be taken only after a number of NPD samples have been detected.

In an example implementation, a neural network is used to classify images from the Oxford Pet data set. The images are classified into 37 classes of dog and cat breeds. The data set consists of 3,662 training samples and 3,673 test samples. The model is trained for the MobileNet v1 ML architecture. The resulting trained model achieved an accuracy of 78.8% on the test data set. Between the model's fully connected layer and the last convolutional layer, the MobileNet architecture has a global average-pooling layer. In this layer, each of 1024 activation maps is mapped to a single value by taking the average of all pixels in the activation map.

In an implementation, two sets of feature values were computed using the MobileNet v1 neural network. One set was computed for the original network using a global average pooling layer. This set of feature values was used to compute the class predictions. The other set of feature values was obtained from the MobileNet v1 neural network in which the global average-pooling layer was replaced by a global max-pooling layer. The other set of feature values is used to determine whether an input is very likely NPD data. Instead of mapping each activation map to a single value by taking the average pixel value, a global max-pooling layer takes a maximum pixel value.

The inventors have found that the best results are obtained using the global max-pooling layer in the neural network. In another embodiment, the NPD detection can be done using the feature values returned by using the original global-average pooling layer. This may be desirable when the use case does not allow for the additional time needed to execute some additional layers.

Still referring to FIG. 2, the output values of the max-pooling layer (second to last layer 23) are the feature values $f_i$ and the logit values that are input to the softmax operation are the values $o_j$. Let $w_{i,j}$ be the weight of the edge from node i in the max-pooling layer (second to last layer 23) to node j in the final dense layer (last layer 24). In one embodiment, last layer 24 is a fully connected layer. A gradient $s_{i,j}$ of logit value $z_j$ to feature value $f_i$ is given by weight $w_{i,j}$. As a result, $p_j = \Sigma_{w_{i,j}>0} w_{i,j} \cdot f_i$.

In one embodiment, function h is defined as $h(p_j, n_j) = p_j$. Furthermore, ratio r=0.01, which means that a threshold T is chosen such that about 1% of random NPD samples have the property that equation (1) is true. In another embodiment, a different percentage can be used. Feature contribution threshold T is determined via profiling, where the ImageNet data set was chosen to represent arbitrary NPD data in the illustrated example. In another implementation, a different data set may be used.

Still using the same example implementation, the MobileNet v1 model as trained is applied to the ImageNet training data provides a threshold of T=32.7, meaning that 1% of the ImageNet data has a value of $\max_j h(p_j, n_j) = \max_j p_j$ smaller than threshold T. As validation, it is observed on the ImageNet test set that this threshold value results in a detection of 1% of the samples via equation (1). If equation (1) is checked for all the samples in the Oxford test set, used for training the model, it is observed that none of the samples satisfies equation (1). The smallest value observed for $\max_j h(p_j, n_j)$ is 44.1, which is larger than 32.7. Hence, this approach is able to detect 1% of the NPD data, without incorrectly identifying any of the problem domain (PD) samples as NPD samples. Therefore, there were no false positives in the above described NPD detection algorithm.

Figure 3:
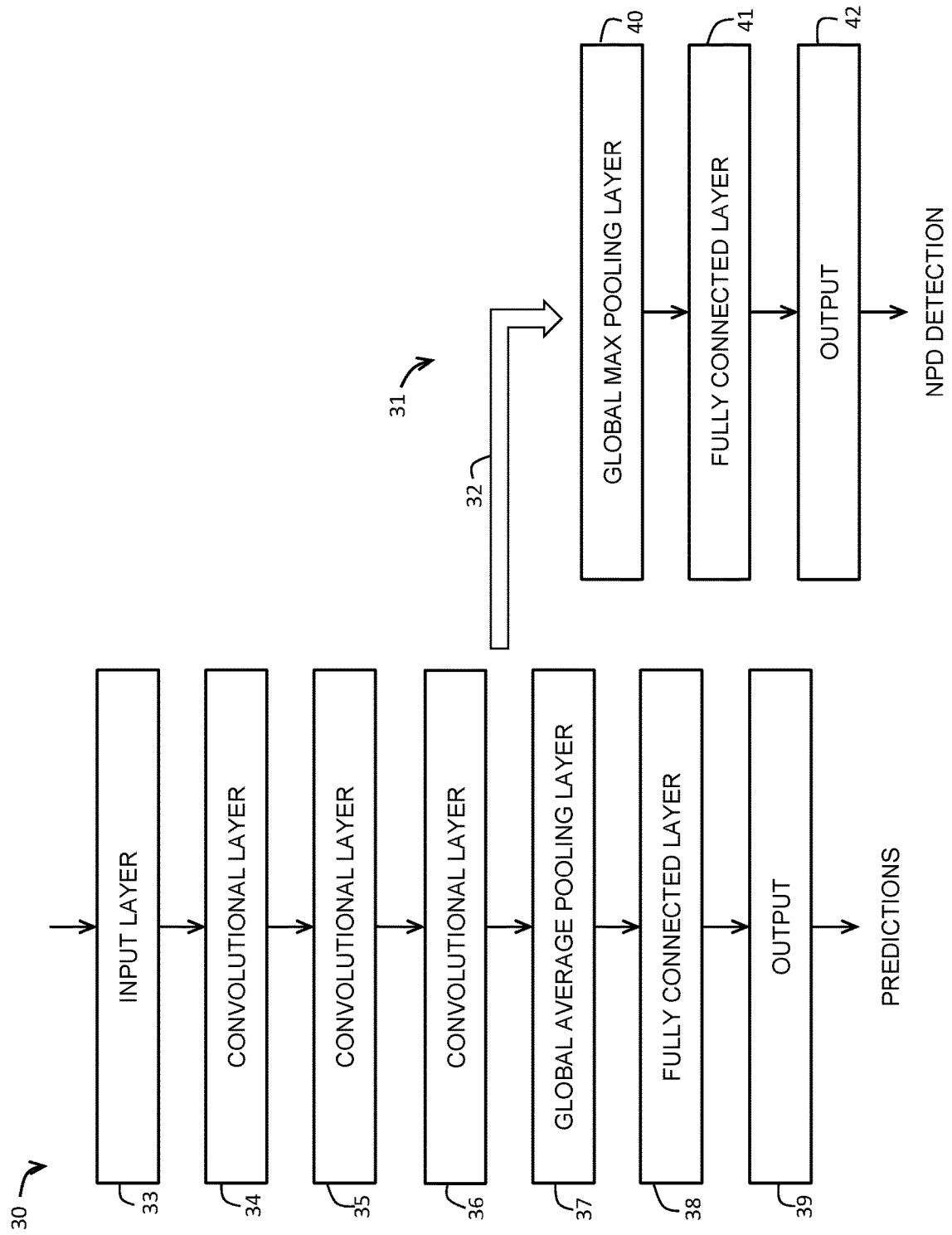
FIG. 3 illustrates a diagram of layers of a neural network for detecting non-problem domain (NPD) samples in accordance with an embodiment.

FIG. 3 illustrates a diagram of layers of a neural network 30 in accordance with an embodiment. Neural network 30 includes input layer 33, convolutional layers 34-36, global average pooling layer 37, fully connected layer 38, and output 39. Note that the illustrated layers of NN 30 are provided for illustrated purposes. Other embodiments may include more layers and the layers may be different. For example, even though three convolutional layers are shown in FIG. 3, there can be any number of convolutional layers. In one embodiment, neural network 30 is for classifying input images. An input sample may be provided to an input of input layer 33, and output layer 39 provides predictions (PREDICTIONS) regarding the classification of the input samples. In one embodiment, neural network 30 may be, for example, an architecture such as MobileNet v1 as discussed above.

In an embodiment as shown in FIG. 3, to improve NPD detection efficiency, full neural network 30 only needs to be executed once with original global-average pooling layer 37 to provide class predictions. To avoid having to do two complete executions of the neural network 30, the execution results of the original neural network up to global average pooling layer 37 can be re-used so that only the last part of the neural network needs to be executed using global max-pooling layer 40 to provide NPD detection. This allows the neural network to be used for both classification and for detecting copying without requiring two complete executions of the neural network.

According to an embodiment, additional layers 31 are provided as a branch 32 from NN 30 just before global average pooling layer 37. Additional layers 31 includes global max pooling layer 40, fully connected layer 41, and output 42 for computing feature contribution values as discussed above in the discussion of FIG. 2 to determine if an input sample is a problem domain sample or a non-problem domain sample. When NPD samples are detected, appropriate action may be taken to make it more difficult for an attacker to copy the ML model.

As can be seen, the embodiment shown in FIG. 3 allows the computation of feature contribution values with global max pooling layer 40 without recomputing the first part of the model for each sample, thus saving significant computation time.

Figure 4:
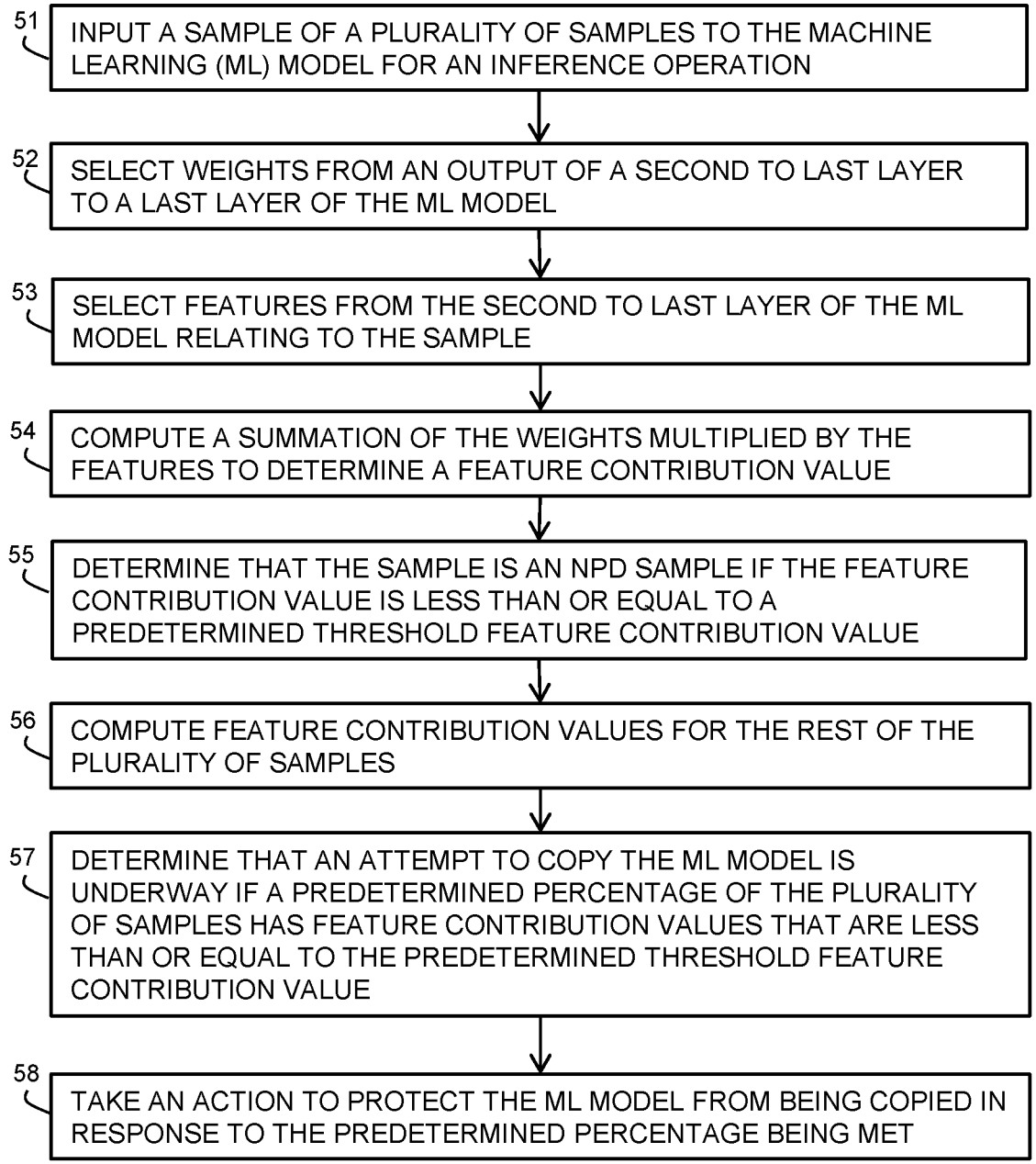
FIG. 4 illustrates a method for protecting a machine learning (ML) model from copying in accordance with an embodiment.

FIG. 4 illustrates method 50 for protecting a machine learning (ML) model from being copied in accordance with an embodiment. Method 50 begins at block 51. At block 51, a sample of a plurality of samples is input to the ML model for an inference operation. At block 52, weights from an output of a second to last layer to a last layer of the ML model are selected. At block 53, features from the second to last layer of the ML model relating to the sample are selected. At block 54, a summation of the weights multiplied by the features is computed to determine a feature contribution value. At block 55, the sample is determined to be an NPD sample if the feature contribution value is less than or equal to a predetermined threshold feature contribution value. At block 56, the feature contribution values for the rest of the plurality of samples is computed. At block 57, an attempt to copy the ML model is determined to be underway if a predetermined percentage of the plurality of samples has a feature contribution value that is less than or equal to the predetermined threshold feature contribution value. At block 59, an action to protect the ML model from being copied is taken in response to the predetermined percentage being met.

FIG. 5 illustrates data processing system 60 useful for implementing an embodiment of the present invention. Data processing system 60 may be implemented on one or more integrated circuits. Data processing system 60 includes bus 62. In other embodiments, bus 62 may be a switching network or other form of interconnection for communication between modules. Connected to bus 62 is one or more processor cores 64, memory 66, interfaces 68, instruction memory 70, and ML model 72. The one or more processor cores 64 may include any hardware device capable of executing instructions stored in memory 66 or instruction memory 70. For example, processor cores 64 may execute the ML algorithms used for training and operating ML model 72 and for computing the feature contribution values and the threshold according the disclosed embodiments. Processor cores 64 may be, for example, a microprocessor, field programmable gate array (FPGA), application-specific integrated circuit (ASIC), or similar device. Processor cores 64 may be implemented in a secure hardware element and may be tamper resistant.

Memory 66 may be any kind of memory, such as for example, L1, L2, or L3 cache or system memory. Memory 76 may include volatile memory such as static random-access memory (SRAM) or dynamic RAM (DRAM), or may include non-volatile memory such as flash memory, read only memory (ROM), or other volatile or non-volatile memory. Also, memory 66 may be implemented in a secure hardware element. Alternately, memory 66 may be a hard drive implemented externally to data processing system 60. Memory 66 may be a secure memory and may be used to store the ML model, to store the weights and biases for the ML model, and to store the feature contribution values as taught herein.

Interfaces 68 may be connected to one or more devices for enabling communication with a user such as an administrator. For example, interfaces 68 may be enabled for coupling to a display, a mouse, a keyboard, or other input/output device. Interfaces 68 may include one or more devices for enabling communication with other hardware devices. For example, interfaces 68 may include, or be coupled to, a network interface card (NIC) configured to communicate according to the Ethernet protocol. Also, interfaces 68 may implement a TCP/IP stack for communication according to the TCP/IP protocols. Also, interfaces 68 may include an application programming interface (API) for interfacing an application with another program, such as an operating system (OS) of data processing system 60. Data samples for classification by ML model 82 may be input via interfaces 68, such as an API or similar interfaces. Various other hardware or configurations for communicating are available.

Instruction memory 70 may include one or more machine-readable storage media for storing instructions for execution by processor cores 64. For example, instruction memory 70 may store instructions for implementing the computations used to protect the ML model from copying. In other embodiments, both memories 66 and 70 may store data upon which processor cores 64 may operate. Memories 66 and 70 may also store, for example, encryption, decryption, and verification applications used to protect sensitive ML model 72. Memories 66 and 70 may be implemented in a secure hardware element and be tamper resistant.

Machine learning model 72 may include trained ML model 16 of FIG. 1 as modified with the described method for protecting the ML model from extraction, or copying. Machine learning model 72 may run on one or more of processor cores 64 or run on its own co-processor (not shown). Also, in one embodiment, ML model 72 may be stored in its own dedicated secure storage of memory 66 or stored encrypted in an unsecure memory portion of memory 66.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for protecting a machine learning (ML) model from being copied, the method comprising:
   providing an input sample to the ML model for an inference operation;
   selecting features from an internal layer of the ML model, the features relating to the input sample;
   selecting positive gradients of output logits to the features of the ML model;
   computing a summation of a product of positive gradients and the features to determine a feature contribution value;
   determining that the input sample is a NPD sample if the feature contribution value is less than or equal to a predetermined threshold feature contribution value; and
   determining that an attempt to copy the ML model is underway if a predetermined percentage of a plurality of input samples input to the ML model has feature contribution values that are less than or equal to the predetermined threshold feature contribution value.

2. The method of claim 1, wherein the internal layer is one of either a global average pooling layer or a global max pooling layer.

3. The method of claim 1, wherein the logits are provided by a fully connected layer.

4. The method of claim 1, wherein selecting positive gradients of the features to output logits further comprises selecting weights from a second to last layer that are greater than zero.

5. The method of claim 1, wherein the ML model is used for image classification.

6. The method of claim 1, further comprising taking an action to protect the ML model from coping in response to determining that an attempt to copy the ML model is underway.

7. The method of claim 6, wherein taking an action to protect the ML model further comprises one or more of limiting a number of input samples within a time window, reporting the copying attempt to a host processor, and substituting a lower quality ML model.

8. The method of claim 1, wherein the internal layer is a global average pooling layer, the method further comprising adding a branch to the ML model starting before the global average pooling layer, wherein the branch includes a global max pooling layer and a fully connected layer, and wherein the ML model provides predictions for the inference operation in response to receiving the sample, and the branch determines if the sample is a NPD sample.

9. The method of claim 1, wherein the predetermined threshold feature contribution value is predetermined by profiling the ML model on a plurality of NPD samples.

10. The method of claim 1, wherein the predetermined percentage of the input samples that are less than or equal to the predetermined threshold feature contribution value is one percent.

11. A method for protecting a machine learning (ML) model from being copied, the method comprising:
    inputting a sample of a plurality of samples to the ML model for an inference operation;
    selecting weights from an output of a second to last layer to a last layer of the ML model;
    selecting features from the second to last layer of the ML model relating to the sample;
    computing a summation of the weights multiplied by the features to determine a feature contribution value;
    determining that the sample is a NPD sample if the feature contribution value is less than or equal to a predetermined threshold feature contribution value;
    computing the computation of the feature contribution value for the rest of the plurality of samples;
    determining that an attempt to copy the ML model is underway if a predetermined percentage of the plurality of samples has a feature contribution value that is less than or equal to the predetermined threshold feature contribution value; and
    taking an action to protect the ML model from being copied in response to the predetermined percentage being met.

12. The method of claim 11, wherein the second to last layer is one of either a global average pooling layer or a global max pooling layer.

13. The method of claim 11, wherein the last layer is a fully connected layer.

14. The method of claim 11, wherein selecting weights from an output of the second to last layer further comprises selecting weights that are greater than zero.

15. The method of claim 11, wherein the ML model is used for image classification.

16. The method of claim 11, wherein taking an action to protect the ML model further comprises one or more of limiting the number of samples that can be input in a given time window, reporting the copying attempt to a host processor, and substituting a lower quality ML model.

17. The method of claim 11, wherein the second to last layer is a global average pooling layer, the method further comprising adding a branch to the ML model starting before the global average pooling layer, wherein the branch includes a global max pooling layer and a fully connected layer, and wherein the ML model provides predictions for the inference operation in response to receiving the sample, and the branch determines if the sample is a NPD sample.

18. The method of claim 11, wherein the predetermined threshold feature contribution value is predetermined by profiling the ML model on a plurality of NPD samples.

19. The method of claim 11, wherein the predetermined percentage of the input samples that are less than or equal to the predetermined threshold feature contribution value is one percent.

20. The method of claim 11, wherein the method is implemented as a computer program comprising instructions stored in a non-transitory machine-readable storage medium.

* * * * *